United States Patent [19]

Nishimura et al.

[11] Patent Number: 5,053,261
[45] Date of Patent: Oct. 1, 1991

[54] FRICTION MATERIAL

[75] Inventors: Yoshio Nishimura; Shigeho Maeda, both of Osaka, Japan

[73] Assignee: Kabushiki Kaisha Daikin Seisakusho, Neyagawa, Japan

[21] Appl. No.: 595,731

[22] Filed: Oct. 11, 1990

Related U.S. Application Data

[63] Continuation of Ser. No. 381,708, Jul. 3, 1989, abandoned.

[30] Foreign Application Priority Data

Nov. 20, 1987 [JP] Japan .................. 62-177390

[51] Int. Cl.$^5$ .................. B32B 3/08; B32B 15/00
[52] U.S. Cl. .................. 428/65; 428/141; 428/341; 428/457; 188/251 M
[58] Field of Search .................. 428/65, 341, 457, 141; 192/107 M; 188/251 M, 218 XL

[56] References Cited

U.S. PATENT DOCUMENTS 4,351,885  9/1982  Depoisier et al. .................. 188/251 M
4,585,691  4/1986  Nishimura et al.

FOREIGN PATENT DOCUMENTS 55-38031  10/1980  Japan .

Primary Examiner—Alexander S. Thomas
Attorney, Agent, or Firm—Armstrong, Nikaido, Marmelstein, Kubovcik & Murray

[57] ABSTRACT

A friction material (1) comprising a flame sprayed metal film (4) in an amount of 10 mg/cm$^2$ which is formed on at least whole range of outer peripheral side of an annular friction surface (3) provided at center with large diameter hole (2), of which radial length (B) is one-third of radial length (A) from outer periphery of said friction surface (3) to said large diameter hole (2).

2 Claims, 2 Drawing Sheets

FRICTION MATERIAL

This application is a continuation of application Ser. No. 381,708, filed July 3, 1989, now abandoned

TECHNICAL FIELD

This invention relates to friction materials such as a clutch facing, a disc pad and a brake lining etc.

BACKGROUND ART

Conventional frictions material is used, for example, for a clutch facing of a clutch disc which is generally manufactured by impregnating phenolic resin as a binding agent to a non woven fabric, and then heating and pressing them. However, in case that the conventional clutch is used immediately after manufacture, whole friction surface is not always pressed on a pressure plate or a flywheel, so that desired friction coefficient $\mu$, denoted by a curve Y of FIG. 3, can not be obtained under the initial condition of use. Therefore, in the conventional manufacturing process of clutch facing, a troublesome method such as resin coating on the friction surface must be carried out in order to obtain desired friction coefficient under the initial condition of use.

Furthermore, as shown in FIG. 4, outer periphery of a friction surface 101 of a pressure plate 100 may slightly inclines to a flywheel 102 in order to obtain a large transmission torque. Since outer periphery of the pressure plate 100 contacts partially with outer periphery of a friction surface 104 of a clutch facing 103 in this case, only outer periphery of the friction surface 104 is worn out exclusively as shown by a two-dot chain line D of FIG. 4, so that rust is produced thereat to induce troubles such as a decrease in a friction coefficient etc.

In order to enhance the effect to prevent the rust, a structure comprising thin-layer rust-preventive material, consists of a mixture which is including a caking material mainly composed of zinc or cadmium, is coated on a friction surface of friction material which is pressing on a surface of oppenent friction material so as to transfer the rust-preventive material to the surface of oppenent friction material (Japanese Patent Application No. 50-82207) has been proposed. Or a friction material comprising a friction material substrate, a flame sprayed metal which can be a sacrifical anode for iron on a surface of the substrate in an amount of 0.5 mg/cm$^2$ to 8.0 mg/cm$^2$ (U.S. Pat. No. 4,585,691), has also been proposed.

However, since an object of these structures is exclusively to obtain the effect to prevent the rust, they do not improve a friction coefficient of a friction material under the initial condition immediately after manufacuture. Futhermore, when the conventional friction materials are applied under the condition as illustrated in FIG. 4, their friction surface may peeled, so there is a difficulty to employ them.

This invention relates to an improvement in a friction material which is used under the condition mentioned above.

A main object of the present invention is to improve a friction coefficient of a friction material under the immediate situation after manufacture by forming a flame sprayed metal film on at least outer periphery of friction surface.

Further objects of the present invention are to enhance the effect to prevent the rust and to improve a durability of the material.

DISCLOSURE OF INVENTION

A friction material comprising a flame sprayed metal film in an amount of 10 mg/cm$^2$ to 25 mg/cm$^2$ which is formed on at least whole range of outer peripheral side of an annular friction surface provided at center with larger diameter hole, of which radial length is one-third of radial length from outer periphery of said friction surface to said large diameter hole.

BEST MODE FOR CARRYING OUT THE INVENTION

Figure 1:
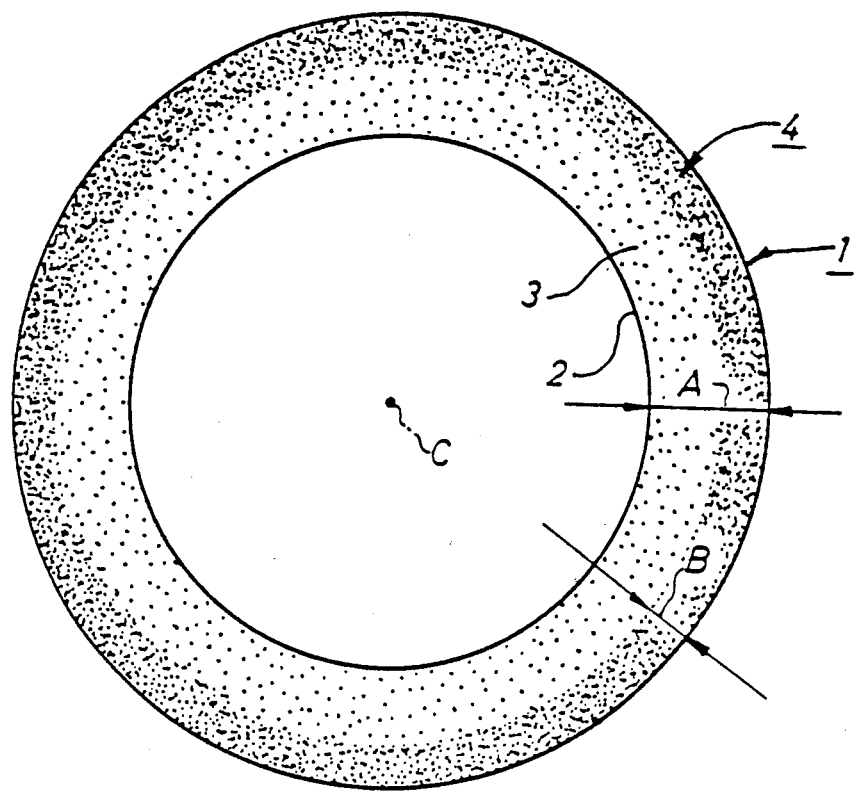
FIG. 1 is a front view of a friction material of this invention.

In FIG. 1, which shows a front view of a friction material 1 of this invention, 3 denotes a friction surface of the friction material 1, which is provided at whole outer peripheral range with flame sprayed metal film 4 that is 10 mg/cm$^2$ to 25 mg/cm$^2$. Let A be a radial length of the friction surface 3 between outer periphery of the surface 3 and a larger diameter hole 2, and let B be a radial length of outer pheriphery of the surface 3 at which metal film 4 is formed, B is as one-third length as A. Incidentally, when the length B is set up within two-thirds of the length A, the flame sprayed metal film 4 will contribute toward decreasing wear, especially, in case that outer periphery of a pressure plate inclines to a flywheel (not shown). In FIG. 1, C denotes a center of the friction material 1.

Figure 2:
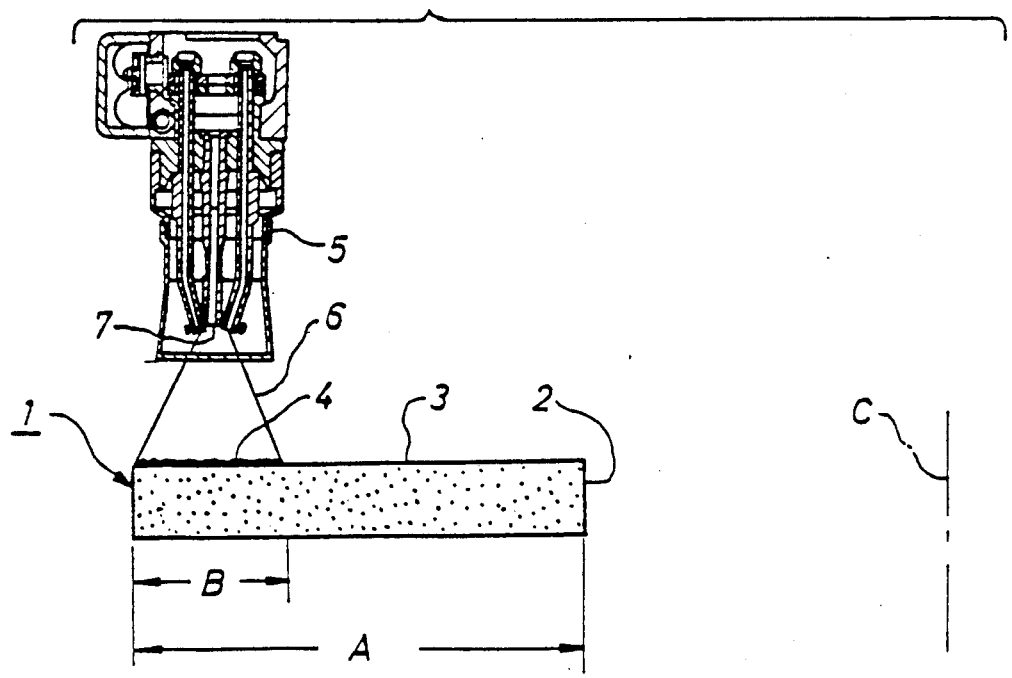
FIG. 2 is a vertical sectional view of an arc type flame spraying torch and friction material showing a manufacturing method of the present invention.

FIG. 2 shows a manufacturing method of the present invention.

In FIG. 2, 5 denotes an arc type of metal spraying torch which is employed to this embodiment. A spraying material 6 is sprayed from an spraying port 7 of the torch 5 onto the friction surface 3 of the friction material 1. When spraying port 7 of the torch 5 is brought near to radial outer peripheral side of the friction surface 3 as illustrated in FIG. 2, the material 6 is sprayed only on outer peripheral side of the friction surface 3.

Zinc or zinc alloy can be used for the material 6, copper or copper alloy (brass, for instance) can be used particularly to maintain initial friction coefficient.

Figure 3:
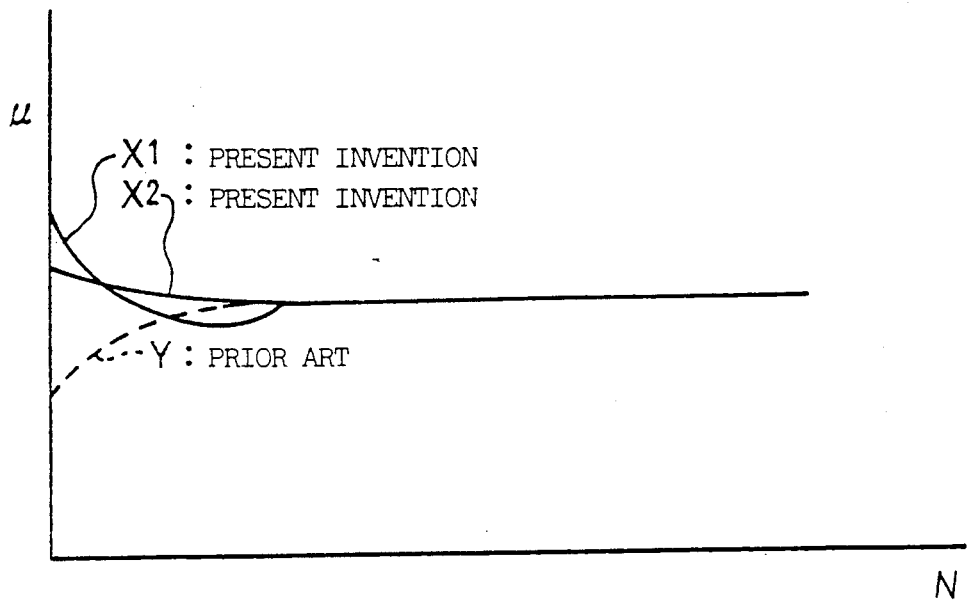
FIG. 3 is a friction coefficient-frequency diagram showing measured results comparing initial coefficient of friction materials of this invention with conventional one.

FIG. 3 is a friction coefficient-frequency diagram showing measured results comparing initial coefficient of friction materials of this invention with conventional one. X1 and X2 denote the measured results of forgoing friction material 1 (FIG. 1 and FIG. 2) of this invention, and Y denotes the measured result of conventional friction material of which friction surface has no metal film.

Measured Results (1) The flame sprayed metal film 4 (FIG. 1 and FIG. 2) is formed on a friction material 1 that is 0.30 to 0.35 coefficient $\mu$ of friction when it has no metal film. The result of initial coefficient $\mu$ was 0.34 to 0.39 when the amount of the flame sprayed metal film 4 was 10 mg/cm$^2$, and the result of initial coefficient $\mu$ was 0.49 to 0.56 when the amount of the flame sprayed metal film 4 was 25 mg/cm$^2$.

② The flame sprayed metal film 4 is also formed on a friction material that is 0.34 to 0.37 coefficient $\mu$ of friction. The result of initial coefficient $\mu$ was 0.36 to 0.42 when the amount of the flame sprayed metal film 4 was 10 mg/cm$^2$, the result of initial coefficient $\mu$ was 0.37 to 0.49 when the amount of the flame sprayed metal film 4 was 18 mg/cm$^2$, and the result of initial coefficient $\mu$ was 0.51 to 0.63 when the amount of the flame sprayed metal film 4 was 25 mg/cm$^2$.

Effects of the Invention

As described above, since a friction material 1 comprising a flame sprayd metal film 4 in an amount of 10 mg/cm$^2$ to 25 mg/cm$^2$ which is formed at least whole range of outer peripheral side of an annular friction surface 3 which is provided at center with large diameter hole 2, of which radial length B is one-third of radial length A from outer periphery of said friction surface 3 to said large diameter hole 2 in accordance with this invention, the initial coefficient $\mu$ of friction can be maintained at the desired value.

The following effects can also be accomplished in accordance with present invention:

① The flame sprayed metal file 4 prevents the rust of outer periphery of friction material 1, when zinc or copper or alloy including zinc or copper is used for the flame sprayed metal file 4.

e,crc/2/ Since the flame sprayed metal film 4 is formed on at least whole range (radial length B) of outer peripheral side of friction surface 3, so-called judder can also be minimized.

Furthermore, when the length B of flame sprayed metal film 4 is set up at one-third of radial length A, the above mentioned effects can also be accomplished spending comparatively small quantity of metal 6, so the total mass of friction material 1 will be smaller than that of structure of which film is formed on whole friction surface, thus inertia can also be minimized.

Figure 4:
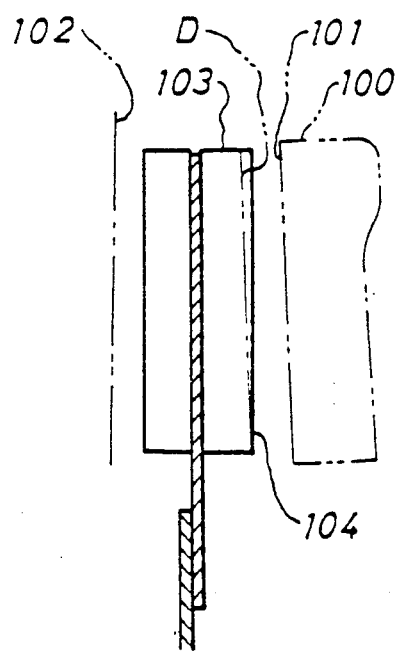
FIG. 4 is a vertical sectional view of the conventional friction material.

③ Since the flame sprayed metal film 4 is formed on outer peripheral side of friction surface 3, wear of friction surface can also be avoided even if the present invention is embodied in the structure as shown in FIG. 4 that outer periphery of pressure plate 100 is slightly inclines to a flywheel 102, so the initial coefficient $\mu$ can also be maintained at high value. Since wear of friction surface 3 can be avoided, the effect to prevent the rust can also be improved.

Since the flame sprayed metal film 4 is formed on outer peripheral side of friction surface 3, the coefficient $\mu$ of outer periphery of friction surface 3 which is predominately effective for the transmission torque can be maintained at high value from the initial situation.

④ Since the flame sprayed metal film 4 is formed at whole outer periphery of friction surface 3, the inertia is hard to be occured.

INDUSTRIAL APPLICABILITY

This invention can be embodied for a friction material for use in a friction lining which is applied mainly to automobiles, such as a passenger car, a vehicle for industrial construction machine etc. and for other power transmission devices.

We claim:

1. A friction facing for use on a first member for frictional engagement with a second member, said first member having a large diameter center opening and a peripheral area around said center opening having a friction material affixed thereto and forming said friction facing thereon, said friction material having a lower friction coefficient during initial periods of use immediately after manufacture of said friction material on said first member than the friction coefficient after said initial periods of use, said friction facing having a flame sprayed metal film in an amount of 10 mg/cm$^2$ to 25 mg/cm$^2$ around the annular periphery of said peripheral area and extending radially inwardly for not more than one third the radial length of said friction facing, said flame sprayed metal film raising said friction coefficient of said friction material during said initial period of use.

2. A friction material as set forth in claim 1, wherein said metal is selected from the group consisting of zinc, copper and alloys of zinc and copper.

* * * * *